FIG. I

United States Patent Office — 3,810,819, Patented May 14, 1974

3,810,819
ANTI-TUMOR SUBSTANCE FROM HEMOLYTIC STREPTOCOCCI AND PROCESS FOR PRODUCING THE SAME USING AMMONIUM SULFATE
Hajime Okamoto, Susumu Shoin, and Saburo Koshimura, Kanazawa, Japan, assignors to Hajime Okamoto, Kanazawa-shi, Japan
Filed Sept. 4, 1970, Ser. No. 69,774
Claims priority, application Japan, Sept. 6, 1969, 44/70,283
Int. Cl. C07g 7/00
U.S. Cl. 195—4       22 Claims

ABSTRACT OF THE DISCLOSURE

Living cells of hemolytic streptococci are ground by a mechanical means or subjected to an enzyme treatment, and are then centrifuged, whereby a supernatant solution is obtained. The thus obtained supernatant solution is subjected to salting out with ammonium sulfate, whereby a fraction, which will precipitate at 50–80% saturated ammonium sulfate concentration is obtained. If necessary, the thus obtained fraction is purified by making it contact with an ion exchanger, a gel filtering agent or calcium phosphate gel.

---

This invention relates to an anti-tumor substance and a process for producing the same.

It is well known that living cells of hemolytic streptococci have an anti-tumor activity, but this anti-tumor substance in the cells is very unstable against temperature and other physico-chemical conditions. Therefore, it has been difficult to separate the anti-tumor substance from the hemolytic streptococci without lowering its activity.

The present inventors previously succeeded in obtaining an anti-tumor substance in the cells by adding such an organic solvent as acetone, etc. to an aqueous cell-free extract solution of the hemolytic streptococci and collecting the resulting precipitates (Japanese patent publication No. 1647/63. However, this substance contains a large amount of proteins and other various components derived from the cells, and there was a danger of subsidiary ill effects and the medical effect upon the tumor was not yet satisfactory.

An object of the present invention is to provide a process for producing an anti-tumor substance from the cells of hemolytic streptococci in a more purified state without lowering its activity and also to provide a good anti-tumor substance.

According to the present invention, the anti-tumor substance can be obtained by salting out an aqueous cell-free extract solution of living cells of hemolytic streptococci with ammonium sulfate, collecting precipitates formed at a 50–80% saturated ammonium sulfate concentration, and, if necessary, purifying the precipitates by allowing it in an aqueous solution state to come in contact with an ion exchanger, a gel filtering agent or calcium phosphate gel.

Now, the present invention will be explained hereunder in detail.

An aqueous cell-free extract solution of living cells of hemolytic streptococci to be used in the production of the present anti-tumor substance is obtained by washing living cells with a physiological sodium saline solution or distilled water, then disintegrating them by a mechanical means or lysing them by an enzyme treatment and removing precipitates by centrifugal separation. For example, according to the mechanical means, the washed cells ars ground in a mortar together with emery powders, alumina powders, etc. and then admixed with distilled water or a physiological sodium saline solution, and a supernatant solution is obtained by centrifugal separation, or the washed cells are suspended in a physiological sodium saline solution or distilled water or the like, and then admixed with fine glass beads and disintegrated by mechanical shaking, and a supernatant solution is obtained by centrifugal separation. When an enzyme treatment is utilized, a cell wall lytic enzyme, which can act upon the cell wall of the hemolytic streptococci, is allowed to act upon the cells, and a supernatant solution can be obtained by centrifugal separation.

Salting out is carried out by placing an aqueous cell-free extract solution of the living cells into a cellophane tube and dialyzing it against an ammonium sulfate solution, or by adding ammonium sulfate to the aqueous cell-free extract solution of the living cells directly little by little. It is preferable that the pH of the ammonium sulfate solution against which the dialysis is carried out or that of the reaction solution, to which ammonium sulfate has been added, is neutral or weakly alkaline (pH: 7–8.2).

To obtain a fraction of 50–80% saturated ammonium sulfate concentration, the following procedure is preferable. The aqueous cell-free extract is at first salted out at a 50% saturated ammonium sulfate concentration to remove the formed precipitates, and the resulting supernatant solution is further salted out at an 80% saturated ammonium sulfate concentration to collect the formed precipitates. Alternatively, the aqueous cell-free extract is at first salted out at an 80% saturated ammonium sulfate concentration, and the formed precipitates, which are dissolved in distilled water or a suitable buffer solution, are further salted out at a 50% saturated ammonium sulfate concentration to remove the resulting precipitates. It is also possible to effect the salting out by increasing the lower limit of the degree of saturation of ammonium sulfate to more than 50% or decreasing the upper limit to less than 80%, depending upon the case.

The thus obtained anti-tumor substance is then dialyzed against distilled water or a buffer solution to remove the remaining ammonium sulfate, and can be reserved in a freezed state or a lyophilized state. The substance can be further purified, if necessary, by allowing it to come in contact with an ion exchanger, a gel filtering agent or calcium phosphate gel. As the ion exchanger, ion exchange resins, ion exchange cellulose, ion exchange dextran gel, etc. are used. As the gel filtering agent, dextran gel etc. are used. The calcium phosphate gel can be used as it is, but it is convenient to use it in the form of hydroxylapatite. An aqueous solution of the substance obtained in the manner as described above is passed through a column packed with these ion exchangers, gel filtering agent or calcium phosphate gel at a suitable rate, or the aqueous solution is once added to a vessel containing the ion exchangers, the gel filtering agent or the calcium phosphate gel to allow the effective substance to come in contact with these treating agents. Elution is carried out with a buffer solution having a suitable salt concentration and pH. The ion exchanger, gel filtering agent or calcium phosphate gel can be used in a combination of at least two kinds of these agents. For example, the solution is allowed to come in contact with dextran gel and the eluted solution is further allowed to come in contact with DEAE-dextran gel. By effecting an elution, an effect of purification can be further increased.

The substance obtained according to the present invention is a high molecular substance incapable of permeating through a semi-permeable membrane, and turns to white powders when lyophilized. The substance itself is well soluble in water, but insoluble in organic solvents. The substance before being allowed to come in contact with the ion exchanger, gel filtering agent or calcium phosphate gel, is positive to ninhydrin reaction, orcinol reaction, Molish reaction and biurette reaction, and has a maximum absorption at 260 m$\mu$. However, the substance, which has been allowed to come in contact with the ion exchanger, gel filtering agent or calcium phosphate gel and eluted therefrom, becomes very weak to the orcinol reaction, and has a maximum absorption at 280 m$\mu$. It is recognized that the substance before being purified with the DEAE-dextran gel has absorptions at 1650 cm.$^{-1}$ and 1520 cm.$^{-1}$, and absorptions at 1235 cm.$^{-1}$ and 1070 cm.$^{-1}$ that seem to be the absorptions due to nucleic acid, but the substance after the DEAE-dextran gel purification has the reduced absorptions at 1235 cm.$^{-1}$ and 1070 cm.$^{-1}$. Similar phenomena are observable when the substance is treated with other ion exchanger, gel filtering agent or calcium phosphate gel.

The present substance is considerably unstable against temperature, and the activity is completely lost when heated at 70° C. for more than 10 minutes. Further, almost all the activity is lost by keeping the substance at 37° C. for one hour, but its activity is not lost by keeping it at 23° C. for one hour. The present substance is also unstable against acids. Considerable inactivation takes place within 24 hours by keeping the substance at 5° C. and a pH of 5, but the substance is relatively stable at a pH of 7–8. In that case, the substance can endure a freeze reservation for about one month. Further, the lyophilized preparation is stable at a low temperature over a long period of time.

The anti-tumor substance obtained according to the present invention has a considerably increased specific activity per weight, as compared with that of the aqueous cell-free extract solution of the living cells. To determine an in vitro anti-tumor activity according to the procedure described in "Chemical and Pharmaceutical Bulletin" (Tokyo), 10, page 462 (1962), the specific activity of the substance before being allowed to come in contact with the ion exchanger, gel filtering agent or calcium phosphate gel, is about 2 to 6 times increased, and that of the substance after the contact is further increased, for example, more than 5 times increased. Reduction of the anti-tumor activity of the present substance throughout the production process is very little, and as less impurities are involved in the substance, there is such an advantage that the subsidiary ill effect is less at the administration. Further, the specific activity per weight of acetone-dried powders prepared from the aqueous cell-free extract solution is not increased almost at all, as compared with the specific activity of the aqueous cell-free extract solution, whereas the specific activity of the present substance obtained according to the present invention is 2 to 6 times increased over that of the aqueous cell-free extract solution. Therefore, the present substance is an excellent anti-tumor substance.

The present invention will be explained in detail hereunder, referring to examples and drawings.

Figure 1:
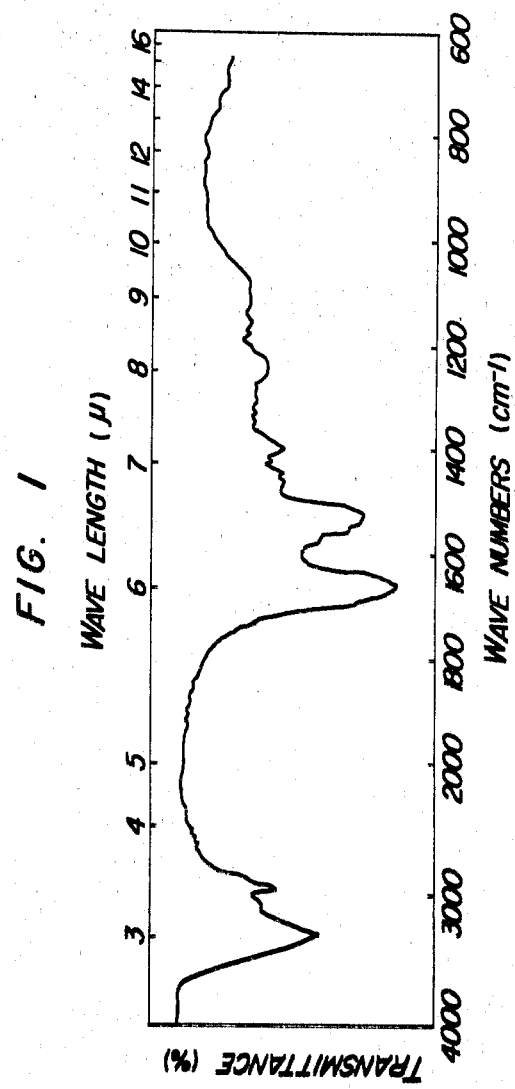
FIG. 1 shows an infra-red absorption diagram of the present substance.

The saturation degree (percent) of ammonium sulfate used herein and in the appending claims is calculated according to Hofmeister; Methods in Enzymology 1, 76 (Ed. by S. P. Colowick and N. O. Kaplan, Academic Press Inc., 1955).

EXAMPLE 1

Streptococcus hemolyticus Su strain (ATCC No. 21060) was cultured in 500 ml. of a meat-infusion broth medium for 20 hours, and total amount of the thus cultured liquor was inoculated in 10 l. of freshly prepared, 3% yeast extract medium (prepared by dissolving a yeast extract in water, adjusting pH to 7.4, heating the resulting solution at 100° C. for one hour, removing precipitates after cooling and sterilizing the solution under a pressure of 1 kg./cm.$^2$ for 10 minutes), and cultured at 37° C. for 20 hours. The cultured liquor was ice-cooled, and centrifuged. The collected cells were twice washed with a cold physiological sodium saline solution and admixed with 20 g. of emery powders and ground in a mortar for about 20 minutes. Then, 50 ml. of cold distilled water was added thereto and the mixture was stirred for 5 minutes, and centrifuged at 9000 r.p.m. for 20 minutes. The precipitates are further admixed with 50 l. of cold distilled water, stirred for 5 minutes, and likewise centrifuged. Total of these two supernatant solutions was 90 ml. The supernatant solution was placed in a cellophane tube and dialyzed for one night, with ice cooling, against an 80% saturated ammonium sulfate solution (neutralized to a pH of 8.2 with 30% aqua ammonia). The dialyzed solution was centrifuged at 9000 r.p.m. for 20 minutes, and the precipitates were dissolved in 50 ml. of distilled water, and again dialyzed for one night against a cold 50% saturated ammonium sulfate solution (neutralized to a pH of 8.2 with 30% aqua ammonia). The dialyzed solution was centrifuged at 9000 r.p.m. for 20 minutes, and the supernatant solution was further dialyzed for one night against a cold 60% saturated ammonium sulfate solution (neutralized to a pH of 8.2 with 30% aqua ammonia). The dialyzed solution was centrifuged at 9000 r.p.m. for 20 minutes, and the thus obtained precipitates were dissolved in 30 ml. of cold distilled water, dialyzed for about 3 hours against cold distilled water, and lyophilized, whereby 0.18 g. of white powders was obtained.

The thus obtained lyophilized powders were dissolved in cold distilled water and 1 ml. of the solution was admixed with 2 ml. of Bernheimer's basal medium (which was prepared from 675 mg. of maltose, adjusted with NaOH to a pH of 6.9, and admixed with 6 ml. of 20% KH$_2$PO$_4$, 12 ml. of 2% MgSO$_4$·7H$_2$O and 66 ml. of distilled water, and will be hereinafter referred to as "BBM"), and 1 ml. of washed Ehrlich cancer cell-BBM suspension solution (6×10$^7$ cells/ml.), incubated for 60 minutes at 37° C. and then 0.5 ml. thereof for each mouse was injected intraperitoneally into ddY mice. As a control, the same amount of distilled water was used in place of the solution of anti-tumor substance prepared according to the present invention, and treated in the same manner as above. Number of survivals after 60 days from the injection was observed. The result is shown in Table 1.

TABLE 1

| Sample | Concentration (mg./ml.) | Number of survivals/number of tested mice |
| --- | --- | --- |
| Anti-tumor substance according to the present invention | 20.0 | 10/10 |
| Do | 10.0 | 10/10 |
| Do | 5.0 | 0/10 |
| Control (distilled water) | | 0/10 |

EXAMPLE 2

Streptococcus hemolyticus Su strain was cultured in 160 ml. of the same 3% yeast extract medium as in Example 1 for 20 hours, and the culture liquor was centrifuged continuously at 10000 r.p.m. to collect cells. The thus obtained cells were twice washed with a cold physiological sodium saline solution and suspended in 1000 ml. of a cold 0.01 M phosphate buffer solution (pH: 7.2). The suspension was admixed with 750 g. of fine glass beads having an average size of 0.11 mm. The cells were disintegrated with a homogenizer (made by Braun Co.) at 4000 r.p.m. for 6 minutes with cooling by several tens of batches. The resulting solution was centrifuged at 7000 r.p.m. for 10 minutes, and the supernatant solution was passed through a membrane filter to remove intact cells. Among 900 ml. of the resulting filtrate, 800 ml. thereof was admixed, with stirring and ice cooling, with 312 g. of pulverized ammonium sulfate crystals little by little over a period of about 30 minutes, and further cooled, as it was, for 30 minutes with continued stirring. Then, the solution was centrifuged at 10000 r.p.m. for 10 minutes, and the supernatant solution was further salted out by admixing with 114 g. of fine powders of ammonium sulfate crystals, and centrifuged. The resulting precipitates were suspended in 70 ml. of cold distilled water and dialyzed for three hours against cold distilled water, whereby 80 ml. of a dialyzate was obtained. 17 ml. of the resulting solution was lyophilized and 600 mg. of white powders was obtained.

The lyophilized powders were dissolved in 0.01 M phosphate buffer solution (pH: 7.2) and used as a sample. A growth inhibitory ratio upon Yoshida sarcoma cells was determined in the same manner as above described in "Chemical and Pharmaceutical Bulletin" (Tokyo), 10, 462 (1962). The reciprocal of the sample concentration at 50% inhibitory ratio was defined as "in vitro antitumor activity." As the result, the specific activity per unit weight (in vitro anti-tumor activity/weight of lyophilized sample) was 1.8 times increased over the specific activity of the aqueous cell-free extract solution.

EXAMPLE 3

Figure 2:
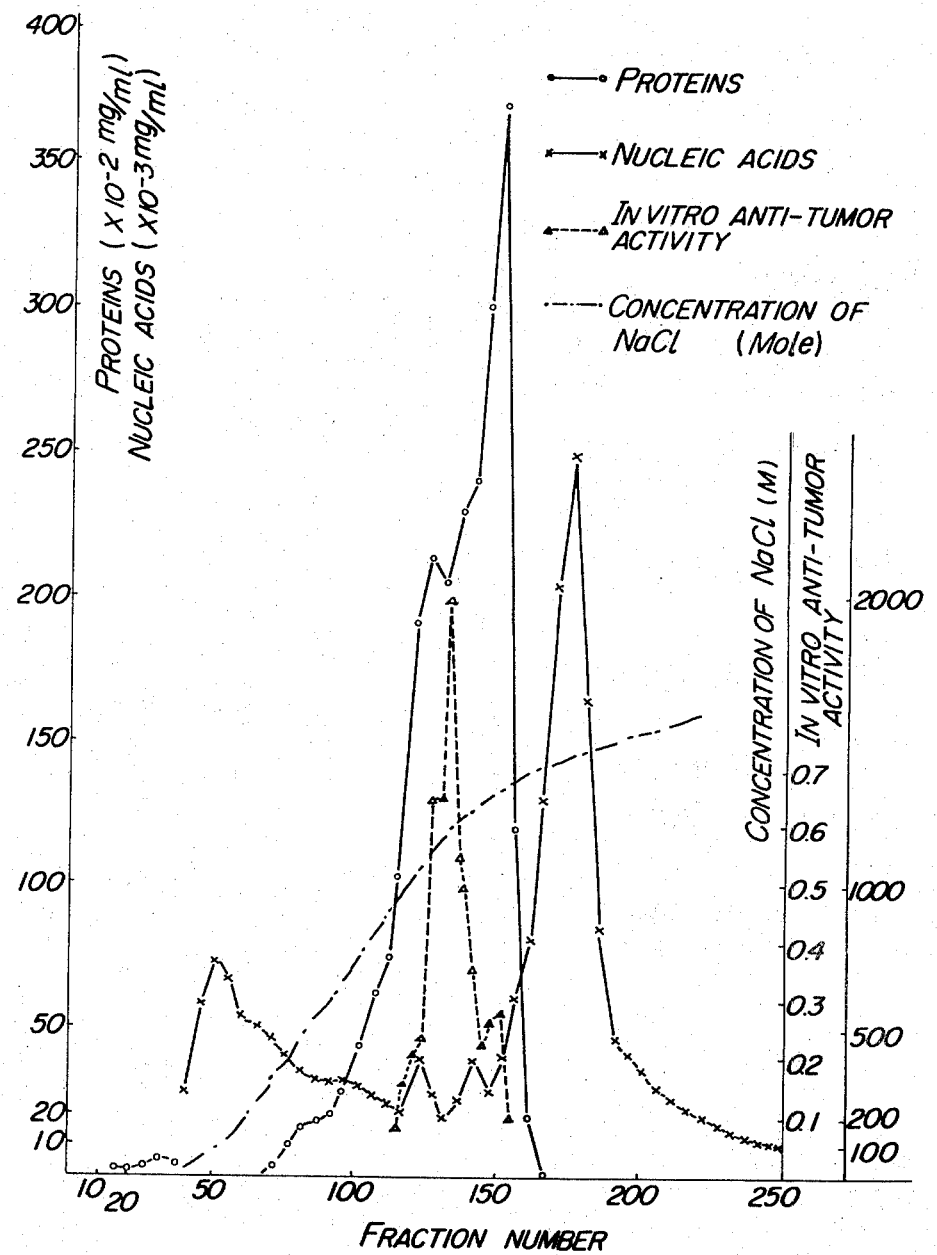
FIG. 2 shows column chromatograms as illustrated in Example 3.

Fraction by ammonium sulfate obtained in Example 2 was dialyzed against cold distilled water, and among 80 ml. of the thus obtained solution, 54 ml. thereof was adsorbed in a column (3.5 x 80 cm.) of DEAE-Sephadex A-50 (produced by Pharmacia Co.) made in equilibrium by a 0.01 M phosphate buffer solution (pH: 7.2) in advance, and a 1 M sodium chloride solution was continuously admixed with 15 l. of a 0.01 M phosphate buffer solution (pH: 7.2) so as to increase linearly the sodium chloride concentration in the phosphate buffer solution. The elution was carried out at an eluting rate of 1 ml./ minute. The eluate was divided into 10 ml. fractions, and the in vitro anti-tumor activity for each fraction was determined in the same manner as for the product in Example 2, and 128 ml. of the fractions having activities (fraction No. 127–139) was collected. The column chromatograms at that time are shown in FIG. 2. The thus obtained fractions were dialyzed for about 3 hours against cold distilled water, and then lyophilized, whereby 206 mg. of white powders was obtained. Elemental analysis percent of the thus obtained substance revealed that carbon was 46.05, hydrogen 7.40 and nitrogen 14.32. The substance has a molecular weight of approximately 200,000.

The substance was dissolved in a phosphate buffer solution (pH:7.2) and the in vitro anti-tumor activity was determined in the same manner as for the product in Example 2. The specific activity per unit weight was 5.3 times increased over the specific activity of the aqueous cell-free extract solution, and 2.9 times increased over the specific activity of the ammonium sulfate fractions before the purification by DEAE-Sephadex.

The substances obtained in Examples 2 and 3 were dissolved in a 0.01 M phosphate buffer solution (pH: 7.2) and the anti-tumor activities of the solution were determined in the same manner as in Example 1. The results are shown in Table 2.

TABLE 2

| Sample | Concentration (mg./ml.) | Number of survivals after 30 days from the injection/number of tested mice |
|---|---|---|
| Anti-tumor substance according to Example 3 | 13.4 | 8/10 |
| Do | 6.7 | 2/10 |
| Do | 3.4 | 0/10 |
| Anti-tumor substance according to Example 2 | 36.0 | 10/10 |
| Do | 18.0 | 6/10 |
| Do | 9.0 | 4/10 |
| Do | 4.5 | 0/10 |
| Aqueous cell-free extract solution | 74.0 | 10/10 |
| Do | 37.0 | 8/10 |
| Do | 18.5 | 6/10 |
| Do | 9.3 | 2/10 |
| Control (0.01 M phosphate buffer solution, pH: 7.2) | 0 | 0/10 |

EXAMPLE 4

In the same manner as in Example 2, 120 ml. of an aquous cell-free extract solution was obtained from 20 l. of the culture liquor. On the same manner as in Example 2, 46.8 g. of ammonium sulfate was added to the solution to effect salting out, and 17.2 g. of ammonium sulfate was further added to the resulting supernatant solution to repeat the salting out. The thus obtained precipitates were dissolved in a cold 0.005 M phosphate buffer solution (pH: 7.0) and dialyzed against a 0.005 M phosphate buffer solution (pH: 7.0), whereby 40 ml. of the dialyzate was obtained. 10 ml. thereof was adsorbed in a TEAE-cellulose column (2 x 50 cm.) made in equilibrium by a 0.005 M phosphate buffer solution (pH: 7.0) in advance, and then a 1 M sodium chloride solution was continuously admixed with 125 l. of the 0.005 M phosphate buffer solution (pH: 7.0), so as to increase linearly while the sodium chloride concentration of the phosphate buffer solution. The elution was carried out at an eluting rate of 2 ml./minute. The eluate was divided into 10 ml. fractions, and the in vitro anti-tumor activity of each fraction was determined in the same manner as in Example 2, and 50 ml. of the fractions having activities (fractions No. 68–72) was collected. The thus obtained solution was dialyzed for about 3 hours against cold distilled water, and then lyophilized, whereby 23 mg. of white powders was obtained.

The thus obtained substance was dissolved in a 0.01 M phosphate buffer solution (pH: 7.2) and the in vitro anti-tumor activity of the solution was determined in the same manner as for the product in Example 2, and it was found that the specific activity per unit weight was 20.0 times increased over the specific activity of the aqueous cell-free extract solution, and was 2.7 times increased over the specific activity of the ammonium sulfate fraction before the purification by TEAE-cellulose.

EXAMPLE 5

In the same manner as in Example 2, 42.5 ml. of an aqueous cell-free extract solution was obtained from 120 l. of the culture liquor. In the same manner as in Example 2, 350 ml. thereof was admixed with 136 g. of ammonium sulfate to effect salting out, and 50 g. of ammonium sulfate was further added to the resulting supernatant solution to repeat the salting out. The thus obtained precipitates were dissolved in a cold 0.01 M phosphate buffer solution (pH: 7.2) and was dialyzed against a 0.01 M phosphate buffer solution (pH: 7.2), whereby 50 ml. of the dialyzed solution was obtained. 10 ml. thereof was collected and lyophilized, whereby 200 mg. of white powders was obtained. 10 ml. of the remaining solution was adsorbed in a Sephadex G-200 column (3 x 50 cm.) (produced by Pharmacia Co.) made in equilibrium by a 0.1 M phosphate buffer solution (pH: 7.2) in advance, and then elution was carried out at an eluting rate of 0.3 ml./minute with a 0.1 M phosphate buffer solution. The eluate was divided into 5 ml. fractions, and the in vitro anti-tumor activity of the fractions was determined in the same manner as in Example 2, and 40 ml. of the fractions having an activity (Fractions No. 33–40) were collected, dialyzed for about 3 hours against cold distilled water and lyophilized, whereby 24 mg. of white powders was obtained.

The thus obtained white powders were dissolved in a 0.01 M phosphate buffer solution (pH: 7.2) and the in vitro anti-tumor activity of the solution was determined in the same manner as in Example 2, and it was formed that the specific activity per unit weight was 31.8 times increased over the specific activity of the aqueous cell-free extract solution, and 5.4 times increased over the specific activity of the ammonium sulfate fraction before the purification by Sephadex.

EXAMPLE 6

10 ml. of the dialyzate obtained by the ammonium sulfate treatment of Example 5 was adsorbed in a hydroxylapatite column (4.5 x 50 cm.) made in equilibrium by a 0.01 M phosphate buffer solution (pH: 6.9) in advance [the column was prepared from calcium phosphate gel according to the Levin's method (Methods in Enzymology, 5 page 17) (1962)] and elution was carried out stapewisely with 1.1 l. each of 0.01 M, 0.05 M, 0.1 M, and 0.4 M phosphate buffer solutions (pH: 6.9). The thus obtained eluates were divided into 30 ml. fractions, and the in vitro activity of the fractions was measured in the same manner as in Example 2. 390 ml. of the fractions having an activity (Fractions Nos. 142–154; the mole concentration of the phosphate buffer solution was 0.1 M) was collected. The fractions were dialyzed for about three hours against cold distilled water, and then lyophilized, whereby 31 mg. of white powders was obtained.

The thus obtained powders were dissolved in a 0.01 M phosphate buffer solution (pH: 7.2), and the in vitro anti-tumor activity of the solution was determined in the same manner as in Example 2. It was found that the specific activity per unit weight was 26.0 times increased over the specific activity of the aqueous cell-free extract solution and 5.1 times increased over that of the ammonium sulfate fraction before the purification by hydroxylapatite.

EXAMPLE 7

In the same manner as in Example 2, 410 mg. of lyophilized powders were obtained as intracellular substances from living cells of Streptococcus hemolyticus C 203 S strain (ATCC 21546).

The thus obtained dry powders were dissolved into a 0.01 M phosphate buffer solution (pH: 7.2), and used as a sample for determining the in vitro anti-tumor activity in the same manner as in Example 2. The specific activity per unit weight (the in vitro anti-tumor activity/weight of lyophilized sample) was 1.8 times increased over the specific activity of the aqueous cell-free extract solution.

EXAMPLE 8

In the same manner as in Example 2, 540 mg. of lyophiilzed powders were obtained as intracellular substances from living cells of Streptococcus hemolyticus Blackmore strain (ATCC 21548).

The thus obtained dry powders were dissolved in a 0.001 M phosphate buffer solution (pH: 7.2) and used as a sample for determining the in vitro anti-tumor activity in the same manner as in Example 2. The specific activity per unit weight was 1.4 times increased over the specific activity of the aqueous cell-free extract solution.

EXAMPLE 9

The ammonium sulfate fraction of Streptococcus hemolyticus C 203 S strain (ATCC 21546) obtained in Example 7 was subjected to DEAE-Sephadex column chromatography in the same manner as in Example 2, whereby 135 mg. of lyophilized powders were obtained.

The thus obtained powders were dissolved in a 0.01 M phosphate buffer solution (pH: 7.2) and used as a sample for determining the in vitro anti-tumor activity in the same manner as in Example 2. The specific activity per unit weight was 5.2 times increased over the specific activity of the aqueous cell-free extract solution and 2.8 times increased over the specific activity of the ammonium sulfate fraction before the purification by DEAE-Sephadex.

EXAMPLE 10

The ammonium sulfate fraction of Streptococcus hemolyticus Blackmore strain (ATCC 21548) obtained in Example 8 was subjected to DEAE-Sephadex column chromatography in the same manner as in Example 3, whereby 190 mg. of lyophilized powders were obtained.

As a result of determination of the in vitro anti-tumor activity in the same manner as in Example 2, it was found that the specific activity per unit weight was 4.8 times increased over the specific activity of the aqueous cell-free extract solution and 2.3 times increased over the specific activity of the ammonium sulfate fraction before the purification by DEAE-Sephadex.

The substances obtained in Examples 7, 8, 9 and 10 were dissolved in a 0.01 M phosphate buffer solution (pH: 7.2) individually, and the anti-tumor activity was determined in the same manner as in Example 1. The results are shown in Table 3.

TABLE 3

| Sample | Concentration (mg./ml.) | Number of survivals after 30 days from injection/ number of tested mice |
|---|---|---|
| Anti-tumor substance according to Example 9 | 13.4 | 8/10 |
|  | 6.7 | 2/10 |
|  | 3.4 | 0/10 |
| Anti-tumor substance according to Example 10 | 13.4 | 7/10 |
|  | 6.7 | 1/10 |
|  | 3.4 | 0/10 |
| Anti-tumor substance according to Example 7 | 36.0 | 10/10 |
|  | 18.0 | 6/10 |
|  | 9.0 | 3/10 |
|  | 4.5 | 0/10 |
| Anti-tumor substance according to Example 8 | 36.0 | 9/10 |
|  | 18.0 | 5/10 |
|  | 9.0 | 2/10 |
|  | 4.5 | 0/10 |
| Aqueous cell-free extract solution of Streptococcus hemolyticus C203S strain (ATCC 21546) | 74.0 | 8/10 |
|  | 37.0 | 6/10 |
|  | 18.5 | 4/10 |
|  | 9.3 | 1/10 |
| Aqueous cell-free extract solution of Streptococcus hemolyticus Blackmore strain (ATCC 21548) | 74.0 | 9/10 |
|  | 37.0 | 6/10 |
|  | 18.5 | 4/10 |
|  | 9.3 | 1/10 |
| Control (0.01 M phosphate buffer solution; pH: 7.2) | 0 | 0/10 |

EXAMPLE 11

The ammonium sulfate fraction of Streptococcus hemolyticus C 203 S strain (ATCC 21546) was subjected to TEAE-cellulose column chromatography in the same manner as in Example 4, whereby 15 mg. of lyophilized powders were obtained.

The thus obtained powders were dissolved in a 0.01 M phosphate buffer solution (pH: 7.2) and the in vitro anti-tumor activity was determined in the same manner as in Example 2. It was found that the specific activity per unit weight was 18.7 times increased over the specific activity of the aqueous cell-free extract solution and 2.5 times increased over the specific activity of the ammonium sulfate fraction before the purification by TEAE-cellulose.

EXAMPLE 12

The ammonium sulfate fraction of Streptococcus hemolyticus Blackmore strain (ATCC 21548) was subjected to TEAE-cellulose column chromatography in the same manner as in Example 4, whereby 21 g. of the lyophilized powders were obtained.

The powders were dissolved in a 0.01 M phosphate buffer solution (pH: 7.2), and the in vitro anti-tumor activity was measured in the same manner as in Example 2. It was found that the specific activity per unit weight was 14.8 times increased over the specific activity of the aqueous cell-free extract solution and 2.2 times increased over the specific activity of the ammonium sulfate fraction before the purification by TEAE-cellulose.

EXAMPLE 13

The ammonium sulfate fraction of Streptococcus hemolyticus C 203 S strain was subjected to a Sephadex column chromatography in the same manner as in Example 5, whereby 16 mg. of lyophilized powders were obtained.

The thus obtained powders were dissolved in a 0.01 M phosphate buffer solution (pH: 7.2) and the in vitro antitumor activity was determined in the same manner as in Example 2. It was found that the specific activity per unit weight was 30.7 times increased over the specific activity of the aqueous cell-free extract solution, and 5.3 times increased over the specific activity of the ammonium sulfate fraction before the purification by Sephadex.

EXAMPLE 14

The ammonium sulfate fraction of *Streptococcus hemolyticus* Blackmore strain (ATCC 21548) was subjected to Sephadex column chromatography in the same manner as in Example 5, whereby 22 mg. of the lyophilized powders were obtained.

The thus obtained powders were dissolved in a 0.01 M phosphate buffer solution (pH: 7.2) and the in vitro anti-tumor activity was determined in the same manner as in Example 2. It was found that the specific activity per unit weight was 26.3 times increased over the specific activity of the aqueous cell-free extract solution, and 4.4 times increased over the specific activity of the ammonium sulfate fraction before the purification by Sephadex.

EXAMPLE 15

The ammonium sulfate fraction of *Streptococcus hemolyticus* C 203 S strain (ATCC 21546) was subjected to hydroxylapatite column chromatography in the same manner as in Example 6, whereby 20 mg. of the lyophilized powders were obtained.

The thus obtained powders were dissolved in a 0.01 M phosphate buffer solution (pH: 7.2) and the in vitro anti-tumor activity was determined in the same manner as in Example 2. It was found that the specific activity per unit weight was 25.8 times increased over the specific activity of the aqueous cell-free extract solution, and 5.1 times increased over the ammonium sulfate fraction before the purification by hydroxylapatite.

EXAMPLE 16

The ammonium sulfate fraction of *Streptococcus hemolyticus* Blackmore strain (ATCC 21548) was subjected to hydroxylapatite column chromatography in the same manner as in Example 6, whereby 28 mg. of lyophilized powders were obtained.

The thus obtained powders were dissolved in a 0.01 M phosphate buffer solution (pH: 7.2) and the in vitro anti-tumor activity was determined in the same manner as in Example 2. It was found that the specific activity per unit weight was 22.1 times increased over the specific activity of the aqueous cell-free extract solution, and 4.1 times increased over the ammonium sulfate fraction before the purification by hydroxylapatite.

What is claimed is:

1. A process for producing an anti-tumor substance, comprising:
    disintegrating living cells of hemolytic streptococci and removing the precipitate; and
    collecting a fraction of the supernatant solution, which is the cell-free extract, by either—
        salting out said aqueous cell-free extract supernatant solution of living cells of hemolytic streptococci at a 50% saturated ammonium sulfate concentration,
        removing precipitates therefrom,
        salting out the resulting solution at an 80% saturated ammonium sulfate concentration, and collecting precipitates formed; or
        salting out said aqueous cell-free extract solution of living cells of hemolytic streptococci at an 80% saturated ammonium sulfate solution, collecting the resulting precipitates;
        dissolving the precipitates in distilled water or a suitable buffer solution,
        salting out the resulting solution at a 50% saturated ammonium sulfate concentration,
        removing the resulting precipitates therefrom, causing the remaining solute to precipitate, and collecting the resulting precipitate.

2. A process in accordance with claim 1 wherein said disintegrating step comprises:
    grinding said living cells of hemolytic streptococci together with emery powders or alumina powders in a mortar;
    adding distilled water or a physiological sodium saline solution thereto; and
    centrifuging the solution thereby to obtain said aqueous cell-free extract supernatant solution.

3. A process in accordance with claim 1 wherein said disintegrating step comprises:
    suspending said living cells of hemolytic streptococci in a physiological sodium saline solution or distilled water;
    mixing the suspension with fine glass beads;
    shaking the resulting mixture mechanically to disintegrate the cells; and
    centrifuging the solution thereby to obtain said aqueous cell-free extract supernatant solution.

4. A process in accordance with claim 1 wherein said disintegrating step comprises:
    allowing a cell wall lytic enzyme capable of acting upon cell walls of hemolytic streptococci to act upon said hemolytic streptococci; and
    centrifuging the resulting solution thereby to obtain said aqueous cell-free extract supernatant solution.

5. A process in accordance with claim 1 wherein said collecting step comprises:
    salting out said aqueous cell-free extract supernatant solution of living cells of hemolytic streptococci at a 50% saturated ammonium sulfate concentration;
    removing precipitates therefrom;
    salting out the resulting supernatant solution at an 80% saturated ammonium sulfate concentration; and
    collecting precipitates formed.

6. A process according to claim 5, wherein the aqueous cell-free extract solution of living cells of hemolytic streptococci is placed in a cellophane tube and salted out while dialyzing against ammonium sulfate.

7. A process according to claim 6, wherein the ammonium sulfate is at a pH of 7–8.2.

8. A process according to claim 5, wherein the salting out is carried out while adding a solution of ammonium sulfate little by little to the aqueous cell-free extract solution of living cells of hemolytic streptococci.

9. A process according to claim 8, wherein a pH of the extract solution, to which ammonium sulfate is added, is 7–8.2.

10. A process in accordance with claim 1 wherein said collecting step comprises:
    salting out said aqueous cell-free extract solution of living cells of hemolytic streptococci at an 80% saturated ammonium sulfate solution;
    collecting the resulting precipitates;
    dissolving the precipitates in distilled water or a suitable buffer solution;
    salting out the resulting solution at a 50% saturated ammonium sulfate concentration;
    removing the resulting precipitates therefrom;
    causing the remaining solute to precipitate; and
    collecting the resulting precipitates.

11. A process according to claim 10, wherein the aqueous cell-free extract solution of living cells of hemolytic streptococci is placed in a cellophane tube and salted out while dialyzing against ammonium sulfate.

12. A process according to claim 11, wherein the ammonium sulfate is at a pH of 7–8.2.

13. A process according to claim 10, wherein the salting out is carried out while adding a solution of ammonium sulfate little by little to an aqueous cell-free extract solution of living cells of hemolytic streptococci.

14. A process according to claim 13, wherein a pH of the aqueous cell-free extract solution, to which ammonium sulfate is added, is 7–8.2.

15. A process in accordance with claim 1 further including:
   after said collecting step contacting said precipitates with an ion exchanger thereby to purify the same.

16. A process according to claim 15, wherein said ion exchanger is selected from ion exchange resins, ion exchange cellulose, and ion exchange dextran gel.

17. A process in accordance with claim 1 further including:
   after said collecting step, contacting said precipitates with a filtering agent thereby to purify the same.

18. A process according to claim 17, wherein said gel filtering agent is dextran gel.

19. A process in accordance with claim 1 further including:
   after said collecting step, contacting said precipitates with calcium phosphate gel thereby to purify the same.

20. A process according to claim 19, wherein the calcium phosphate gel is in the form of hydroxylapatite.

21. An anti-tumor substance, which is prepared by the process of claim 1 and has the following properties that:
   (a) the substance is a high molecular substance impermeable through a semi-permeable membrane,
   (b) the substance turns to white powders when lyophilized,
   (c) the substance is well soluble in water, but insoluble in an organic solvent,
   (d) the substance is all positive to ninhydrin reaction, orcinol reaction, Molish reaction and biurette reaction,
   (e) the substance has a maximum ultra-violet absorption at 260 m$\mu$,
   (f) the substance has infra-red absorptions at 1650 cm.$^{-1}$, 1520 cm.$^{-1}$, 1235 cm.$^{-1}$, and 10/70 cm.$^{-1}$,
   (g) the substance is completely inactivated when heated at 70° C. for 10 minutes or more, almost inactivated when kept at 37° C. for one hour and undergoes no inactivation at 23° C. for one hour, and
   (h) the substance is unstable under an acidic condition and is considerably inactivated within 24 hours when kept at 5° C. and a pH of 5, but relatively stable at a pH of 7–8.

22. An anti-tumor substance made by the process of claim 1.

References Cited

UNITED STATES PATENTS 2,960,437  11/1960  Friedman et al. ____ 260—112 X
3,480,610  11/1969  Fox _____ 260—112

OTHER REFERENCES

The Federation Proceedings, vol. 12, 1953, Fox et al., pp. 442–3.

Chem. Astracts, vol. 46, 1952, 10384 c-f, Lancefield et al.

J. of Exp. Med. 96, pp. 71–82, 1952, Lancefield et al.

Chem. Abstracts, vol. 42, 1948, 1627g-i, Harris.

The Proteins, Neurath, 1965, vol. III, p. 11.

Advances in Protein Chemistry, vol. 16, 1961, pp. 197–198 and 203, Dixon et al.

HOWARD E. SCHAIN, Primary Examiner

U.S. Cl. X.R.

195—96; 260—112 R; 424—177

UNITED STATES PATENT OFFICE
CERTIFICATE OF CORRECTION

Patent No. 3,810,819      Dated May 14, 1974

Inventor(s) Hajime OKAMOTO et al

It is certified that error appears in the above-identified patent and that said Letters Patent are hereby corrected as shown below:

Column 1, line 68, "ars" should read --are--

Column 7, line 52, "Example 2" should read --Example 3--

Signed and sealed this 17th day of September 1974.

(SEAL)
Attest:

McCOY M. GIBSON JR.
Attesting Officer

C. MARSHALL DANN
Commissioner of Patents